No. 840,191. PATENTED JAN. 1, 1907.
W. BAKER.
BELT STRETCHER.
APPLICATION FILED MAR. 31, 1906.
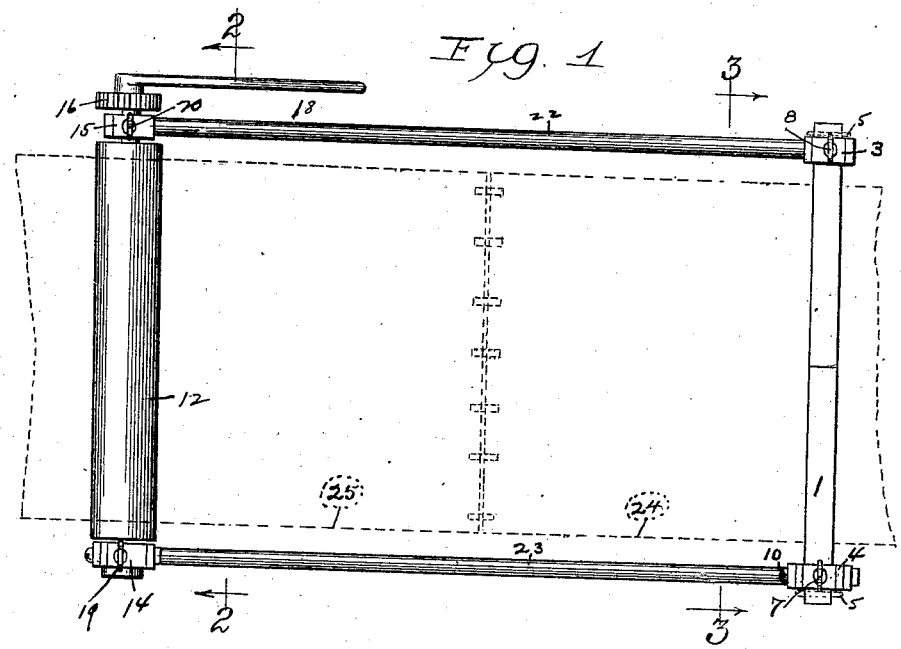
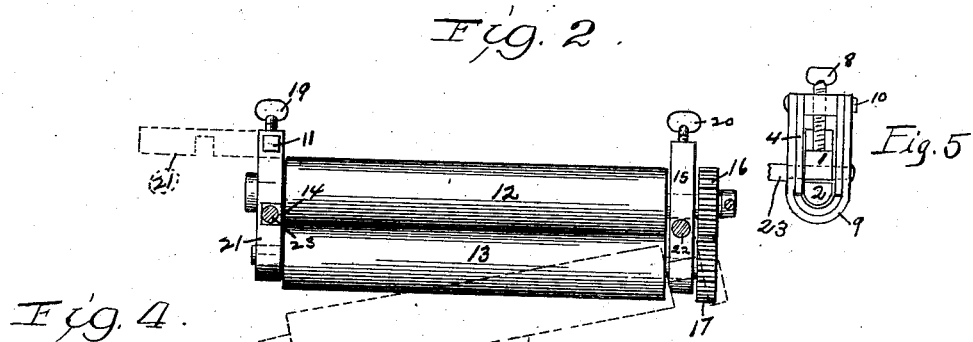
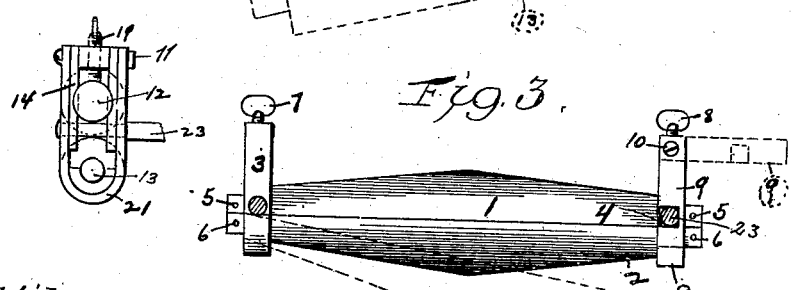
Witnesses
Harry R L White
Ray White
Inventor
W. Baker

UNITED STATES PATENT OFFICE.

WILFRED BAKER, OF ABERDEEN, SOUTH DAKOTA.

BELT-STRETCHER.

No. 840,191.     Specification of Letters Patent.     Patented Jan. 1, 1907.

Application filed March 31, 1906. Serial No. 309,034.

*To all whom it may concern:*

Be it known that I, WILFRED BAKER, a citizen of the United States, residing at Aberdeen, in the county of Brown and State of South Dakota, have invented certain new and useful Improvements in Belt-Stretchers, of which the following is a specification.

My invention relates to improvements in belt-stretchers; and the object of my improvements is to provide means for stretching a belt and for holding the ends of same while being laced or linked together.

In the drawings, Figure 1 is a top plan view of my invention; Fig. 2, a cross-sectional view taken on the line 2 2 of Fig. 1; Fig. 3, a cross-sectional view taken on the line 3 3 of Fig. 1; Fig. 4, a view of the left-hand end of Fig. 2, and Fig. 5 a view of the right-hand end of Fig. 3.

Referring to the drawings in detail, 1 and 2 represent two clamps arranged one above the other and having their opposite ends mounted in slotted frames 3 and 4, respectively, and provided in their outer ends with pins 5 and 6 to prevent the withdrawal of the clamps from the frames 3 and 4, which latter are provided, respectively, with thumb-screws 7 and 8 for engagement with the ends of clamp 1. A link 9 is hinged at 10 to the frame 4 and is adapted to support the adjacent end of clamp 2. The reference-numerals 12 and 13 indicate two rollers arranged one above the other and having their opposite ends rotatably mounted in the slotted frames 14 and 15 and provided at one end with engaging ears 16 and 17, respectively. Roller 12 is provided with a crank-lever 18 for rotating the rollers. Said frames 14 and 15 are provided with set-screws 19 and 20, respectively. Hinged to frame 14 at 11 is a link 21, adapted to support the adjacent end of roller 13. Said frames 3 15 and 4 14 are connected, respectively, by side bars 22 and 23, which have their ends passing through and secured in said frames.

To stretch a belt with my device, one end of the belt, as indicated by the dotted lines 24, is secured between the clamps 1 and 2 in the position shown in Fig. 1. The opposite end of belt, as indicated by the dotted lines 25, is then inserted between the rollers 12 13 and the latter caused to firmly engage the belt by means of the set-screws 19 20. The rollers are then rotated by means of the lever 18, so as to draw and hold the ends of the belt together while the same are sewed or linked together, as shown in Fig. 1. Then the thumb-screws 7 8 and 19 20 are unscrewed and the links 9 and 21 swung outwardly, as indicated by the dotted lines in Figs. 2 and 3, to permit one end of the clamp 2 and roller 13 to drop down, as indicated by the dotted outline of same in Figs. 2 and 3, after which the belt-stretcher may be removed from the belt.

The rollers, if desired, may be covered with rubber, leather, or the like to prevent their marring the belt.

Having thus described my invention, what I claim as new, and desire to secure by Letters Patent, is—

1. In a belt-stretcher, a suitable frame, engaging rollers mounted one above the other in said frame, engaging gears mounted on said rollers, means for rotating said rollers, clamps mounted one above the other in the frame opposite said rollers, links hinged to the frame and adapted respectively to engage or disengage and to support one end of the lower roller and one end of the lower clamp.

2. In a device of the character described, two pair of slotted frames, two rollers mounted one above the other in one pair of said frames, means for rotating said rollers, two clamps arranged one above the other and having their ends mounted in the other pair of frames, bars connecting the roller-frames with the clamp-frames, a link hinged to one of the roller-frames and adapted to carry the adjacent end of the lower roller, and a link hinged to one of the clamp-frames and adapted to carry the adjacent end of the lower clamp.

3. In a belt-stretcher, two pair of slotted frames, two rollers having bearings mounted in one pair of said frames, means for rotating the rollers, means for disengaging one end of one of the rollers, two clamps having their ends mounted in the other pair of frames, means for disengaging one end of one of the clamps, and bars connecting the roller-frames with the clamp-frames.

4. In a belt-stretcher, a suitable frame provided with means for holding one end of a belt, rollers mounted in the frame and adapted to engage and hold the opposite end of the belt, and means for operating the rollers.

5. In a belt-stretcher, a suitable frame provided with means for holding the end of a belt, rollers having bearings in said frame and adapted to hold the opposite end of the belt, means for rotating the rollers, and means for disconnecting the stretcher and belt after connecting the ends of the latter.

In testimony whereof I affix my signature in presence of two witnesses.

WILFRED BAKER.

Witnesses:
C. H. ANDERSON,
C. S. ACKER.